No. 787,767.

Patented April 18, 1905.

UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

ORANGE-RED AZO DYE.

SPECIFICATION forming part of Letters Patent No. 787,767, dated April 18, 1905.

Application filed November 15, 1904. Serial No. 232,897. (Specimens.)

*To all whom it may concern:*

Be it known that we, PAUL JULIUS and ERNST FUSSENEGGER, subjects of the Emperor of Austria-Hungary, residing at Ludwigshafen-on-the-Rhine, in the Kingdom of Bavaria, German Empire, have invented new and useful Improvements in Azo Coloring-Matters, of which the following is a specification.

This invention relates to the production of azo coloring-matters.

We have discovered that new and valuable azo coloring-matters which in the form of their lakes are characterized by excellent fastness against the action of light can be obtained by combining beta-naphthol with diazotized 3.4-dichlor-anilin-5- or 6-monosulfo-acid. The dichlor-anilin-sulfo-acids used in carrying out our invention can be obtained by various methods—for instance, either by sulfonating 3.4-dichlor-anilin or by sulfonating 3.4-dichlor-nitro-benzene and then reducing the dichlor-nitro-benzene-sulfo-acid obtained or by nitrating 3.4-dichlor-benzene-sulfo-acid and then reducing the nitro compound obtained. For the sake of convenience we give the following examples, showing how these sulfo-acids may be produced. The parts are by weight.

*Example 1—Production of 3.4-dichlor-anilin-5-sulfo-acid.*

(*a*) *Sulfonation of 3.4-dichlor-nitro-benzene.*—Introduce one hundred (100) parts of 3.4-dichlor-nitro-benzene, which melts at a temperature of forty-three degrees centigrade (43° C.,) into five hundred (500) parts of fuming sulfuric acid containing about twenty-three (23) per cent. free $SO_3$ and warm the whole for five (5) hours at a temperature of about one hundred and twenty degrees centigrade (120° C.) and add drop by drop during a period of about half an hour one hundred (100) parts of fuming sulfuric acid containing about seventy (70) per cent. of free $SO_3$ and maintain the mixture at the aforesaid temperature until a test portion of it is completely soluble in water. Then allow the mixture to cool, pour it into ice and water, add common salt to the solution, and filter off the sodium salt of dichlor-nitro-benzene-sulfo-acid which separates out, and press and dry.

(*b*) *Reduction of the dichlor-nitro-benzene-sulfo-acid.*—Reduce fifty (50) parts of the sodium salt of dichlor-nitro-benzene-sulfo-acid with iron and acetic acid in the usual manner. Add sodium carbonate until the reduction mixture is alkaline and filter off the iron which is precipitated and then acidify the filtrate by means of mineral acid. The amido-sulfo-acid is soluble in hot water, but on cooling is obtained in the form of white crystals. Its diazo compound consists of colorless crystals which are rather difficultly soluble in water.

*Example 2—Production of 3.4-dichlor-anilin 6-sulfo-acid.*

Introduce fifty (50) parts of dichlor-anilin, which melts at a temperature of from seventy-one to seventy-two degrees centigrade, (71°–72° C.,) into two hundred (200) parts of fuming sulfuric acid containing about twenty-three (23) per cent. of free $SO_3$ and then warm the mixture at a temperature of from one hundred and ten to one hundred and twenty degrees centigrade (110°–120° C.) until a test portion is completely soluble in dilute sodium-carbonate solution. After the melt has cooled pour it onto ice, whereupon the sulfo-acid is obtained in the form of a reddish-colored precipitate. The same result is obtained by heating the acid sulfate of dichlor-anilin at a temperature of two hundred degrees centigrade (200° C.) from six to eight (6–8) hours until a test portion is completely soluble in dilute sodium-carbonate solution.

The following example describing the production of azo coloring-matter from 3.4-dichlor-anilin-sulfo-acid and beta-naphthol will serve to further illustrate the nature of our invention; but we do not limit our invention to this example. The parts are by weight.

Dissolve twenty-four and one-fifth (24.2) parts of 3.4-dichlor-anilin-sulfo-acid obtained according to either of the foregoing examples in about four hundred (400) parts of water and the necessary amount of sodium carbonate. Add seven (7) parts of sodium nitrite and allow this solution to run slowly (while stirring) into a mixture of two hundred (200) parts of water and forty (40) parts of hydrochloric acid containing about thirty (30) per cent. of HCl, while maintaining the whole at a temperature of from five to ten degrees centigrade, (5°-10° C.) When the diazotization is finished, allow the mixture to run (while stirring) into a solution which contains fifteen (15) parts of beta-naphthol in the requisite quantity of caustic-soda solution and which also contains excess of sodium carbonate, whereupon the coloring-matter separates out in the form of a red precipitate. After about half an hour warm to a temperature of fifty degrees centigrade, (50° C.,) filter off the coloring-matter, wash with cold water, and press and dry.

The new coloring-matters form orange pastes and are soluble in water. They are especially applicable to the production of lakes, their barium-aluminium lakes being orange-red. When dyed on animal fiber, they produce yellow-orange shades. Upon reduction with tin and hydrochloric acid they yield 3.4-dichlor-anilin-sulfo-acid and amido-naphthol.

What we claim is—

As new articles of manufacture, the azo coloring-matters which can be obtained by combining a hereinbefore-defined diazotized 3.4-dichlor-anilin-sulfo-acid with beta-naphthol, which coloring-matters are soluble in water, which in the form of their barium-aluminium lakes possess an orange-red color, and which on reduction with tin and hydrochloric acid yield 3.4-dichlor-anilin-sulfo-acid and amido-naphthol.

In testimony whereof we have hereunto set our hands in the presence of two subscribing witnesses.

PAUL JULIUS.
ERNST FUSSENEGGER.

Witnesses:
   ERNEST F. EHRHARDT,
   J. ALEC. LLOYD.